United States Patent
Wu et al.

(10) Patent No.: US 10,574,936 B2
(45) Date of Patent: *Feb. 25, 2020

(54) SYSTEM AND METHOD OF LUMINANCE PROCESSING IN HIGH DYNAMIC RANGE AND STANDARD DYNAMIC RANGE CONVERSION

(71) Applicant: Avago Technologies International Sales PTE. Limited, Singapore (SG)

(72) Inventors: David Wu, San Diego, CA (US); Jason Herrick, Santa Clara, CA (US); Richard Wyman, Santa Clara, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,821

(22) Filed: Oct. 30, 2018

(65) Prior Publication Data
US 2019/0132546 A1    May 2, 2019

Related U.S. Application Data

(63) Continuation of application No. 15/796,445, filed on Oct. 27, 2017, now Pat. No. 10,148,907.

(51) Int. Cl.
*H04N 7/01* (2006.01)
*H04N 9/73* (2006.01)
*H04N 9/77* (2006.01)
*H04N 5/20* (2006.01)
*G06T 5/00* (2006.01)

(52) U.S. Cl.
CPC ........... *H04N 7/01* (2013.01); *G06T 5/009* (2013.01); *H04N 5/20* (2013.01); *H04N 9/73* (2013.01); *H04N 9/77* (2013.01); *G06T 2207/20208* (2013.01)

(58) Field of Classification Search
CPC .. H04N 7/01; H04N 9/73; H04N 9/77; H04N 9/64
USPC ............... 348/441, 444, 450, 453, 458, 459
See application file for complete search history.

(56) References Cited

U.S. PATENT DOCUMENTS

| 2017/0070735 A1* | 3/2017 | Ramasubramonian ...... H04N 19/124 |
| 2018/0007392 A1* | 1/2018 | Lasserre ............... H04N 19/98 |
| 2018/0276801 A1* | 9/2018 | Stessen ................. H04N 9/64 |

OTHER PUBLICATIONS

Non-Final Office Action on U.S. Appl. No. 15/796,445 dated Apr. 6, 2018.
Notice of Allowance on U.S. Appl. No. 15/796,445 dated Jul. 31, 2018.

* cited by examiner

*Primary Examiner* — Sherrie Hsia
(74) *Attorney, Agent, or Firm* — Foley & Lardner LLP

(57) ABSTRACT

In some aspects, the disclosure is directed to methods and systems for transformation between media formats, such as between standard dynamic range (SDR) and high dynamic range (HDR) media or between HDR media formats, without undesired hue shifting, via one or both of a luminance mapping ratio technique and a direct color component mapping technique.

18 Claims, 7 Drawing Sheets

SYSTEM AND METHOD OF LUMINANCE PROCESSING IN HIGH DYNAMIC RANGE AND STANDARD DYNAMIC RANGE CONVERSION

CROSS REFERENCE TO RELATED APPLICATIONS

This application is a continuation of U.S. patent application Ser. No. 15/796,445, filed Oct. 27, 2017, the contents of which is herein incorporated by reference in its entirety for all purposes.

FIELD OF THE DISCLOSURE

This disclosure generally relates to systems and methods for converting between high dynamic range (HDR) media and standard dynamic range (SDR) media.

BACKGROUND OF THE DISCLOSURE

Standard dynamic range (SDR) media, including images, videos, and renderings, has a limited dynamic range for luminance values or brightness of pixels, constrained by the bit depth or number of bits that may be used to represent the luminance of the pixels according to encoding and decoding standards (e.g. 8 bits per sample). By contrast, high dynamic range (HDR) media standards provide more bits or a greater bit depth (e.g. 12, 16, 24, 32 bits or more per sample), allowing a greater range in the image between white and black or bright and dark regions without introducing unacceptable amounts of contouring due to excessive quantization. As a result, media may have higher contrast, darker dark sections and brighter bright sections.

Converting between SDR and HDR or between different HDR media formats may be difficult due to non-linear relationships between values in the SDR format luminance range and values in the HDR format luminance range or between different HDR format luminance values. Similarly, it may be difficult to convert between different HDR formats (e.g. HDR formats with different bit depths or color spaces or different perceptual luminance quantizers). In particular, many implementations of SDR/HDR or HDR/HDR format conversions result in substantial chroma hue shift that may be quite noticeable to the viewer.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
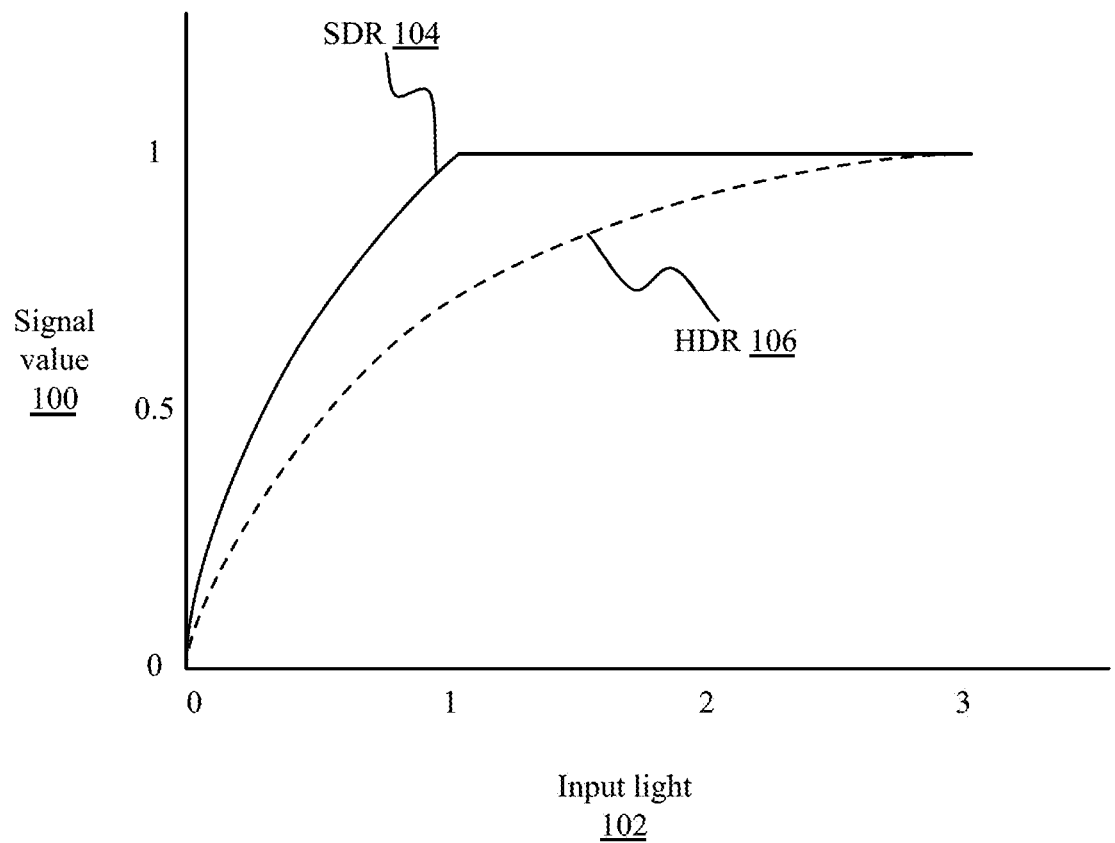
FIG. 1A is a chart illustrating an example of differences between SDR and HDR luminance ranges and mappings.

The details of various embodiments of the methods and systems are set forth in the accompanying drawings and the description below.

DETAILED DESCRIPTION

The following standard(s), including any draft versions of such standard(s), are hereby incorporated herein by reference in their entirety and are made part of the present disclosure for all purposes: SMPTE 2084 "PerceptualQuantizer"; SMPTE ST 2094 "Dynamic Metadata for Color Volume Transform"; High Efficiency Video Codec (HEVC); Ultra HD Forum Phase A; Hybrid Log-Gamma (HLG); Consumer Technology Association HDR10 and HDR10+; and ITU-R Recommendation BT.2100. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for luminance processing during conversions between media formats, including SDR and HDR media formats; and Section B describes a network environment and computing environment which may be useful for practicing embodiments described herein.

A. Systems and Methods for Luminance Processing During Conversions Between Media Formats Standard dynamic range (SDR) and high dynamic range (HDR) media may include images, videos, and renderings, encoded in various formats for distribution, including high efficiency video coding (HEVC), one of the standards promulgated by the Society for Motion Picture and Television Engineers (SMPTE) or the Motion Picture Experts Group (MPEG), or other formats and standards. SDR, sometimes referred to as low dynamic range (LDR), refers to media content with a limited dynamic range for luminance values or brightness of pixels. SDR dynamic range is typically constrained by the bit depth or number of bits that may be used to represent the luminance of the pixels according to encoding and decoding standards (e.g. 8 bits per sample). For example, typical SDR media may have a dynamic range or ratio of luminance from the darkest possible pixel (full black) to the brightest possible pixel (full white) of 1:64. By contrast, the human eye can detect varying brightness over a ratio of approximately 1:1,000,000 (from very dim starlight to the full brightness of the sun, for example, though this may be much greater than necessary for typical media viewing).

High dynamic range (HDR) media standards provide more bits or a greater bit depth than SDR media (e.g. 12, 16, 24, 32 bits or more per sample). This allows a greater range in the image between white and black or bright and dark regions without introducing unacceptable amounts of contouring due to excessive quantization, with dynamic range ratios of 1:8192 or higher, including prototype displays that approach 1:200,000 dynamic range ratios. As a result, media may have higher contrast, darker dark sections and brighter bright sections.

For example, referring first to FIG. 1A, illustrated is a chart illustrating an example of differences between SDR 104 and HDR 106 luminance ranges and mappings. As shown, the chart displays graphs of signal value 100 compared to input light 102. In the chart, the input light 102 and signal values 100 are normalized and unitless. However, other values for luminance may be used, such as 100 candles/m$^2$; and signal values may represent a signal having all bits on (e.g. an 8-bit signal of 1111 1111, for some implementations).

As shown, SDR media 104 has a signal/input luminance curve that may increase relatively steadily from 0 to 1, and then clipping or limited at a full scale value 100 (as additional bits are not provided and the signal value cannot increase beyond the all-bits-on representation). Accordingly, brighter input signals 102 cannot be encoded within the SDR signal 104. To allow these brighter input light values, in some implementations, the SDR luminance curve may be shifted to the right (frequently referred to as increasing the "gamma" offset of the signal). However, the curve region does not grow: increasing the brightness to reflect higher level input signals results in corresponding clipping or limiting of darker signals. Thus, in typical implementations, an SDR display may be calibrated to display a "black" input signal as a dark grey, so as to display a "white" input signal as a bright grey.

Due to its additional bit-depth and better perceptual luminance quantizer which is closer to human visual system, the HDR luminance curve 106 is significantly broader. In the example shown, with the same black level as the SDR luminance curve 104, the HDR luminance curve can provide different signal values 100 for up to three times the same input light values 102. In other implementations, with different bit-depths and/or other nonlinear encoding functions, the curve may be broader or narrower. Furthermore, as discussed above, the SDR luminance curve 104 may be gamma shifted to the right to display differences between brighter areas, at the expense of black values. The HDR luminance curve 104 may be similarly shifted, or may be left unshifted (or shifted by a different amount), with the result that an HDR display may display brighter whites and darker blacks than an SDR display.

Converting between SDR and HDR media formats may be important, particularly during the transition between these technologies, and also for preserving legacy recordings and images generated and encoded in SDR formats. Furthermore, because SDR media uses less data, downconverting of media formats from HDR to SDR may be useful for bandwidth or storage limited environments (e.g. mobile devices). However, such inter-format conversions may be difficult due to non-linear relationships between values in the SDR format luminance range and values in the HDR format luminance range. Similarly, it may be difficult to convert between different HDR formats (e.g. HDR formats with different bit depths or color spaces). In particular, many implementations of SDR/HDR or HDR/HDR format conversions result in substantial chroma hue shift that may be quite noticeable to the viewer.

For example, in the example illustrated in FIG. 1A, the HDR luminance curve 106 is not a linear multiple of the SDR luminance curve 104. This may be further exacerbated in some implementations of SDR luminance, such as where a "knee" is provided within the curve, changing the slope of the curve near the extreme signal values 100 of 0 and/or 1 to cover a broader range of input light values 102. In such implementations, a mapping between the SDR luminance curve and HDR luminance curve may require a piecewise linear function (PWL), a non-linear function, or other such function.

Furthermore, the graph of FIG. 1A illustrates just a single luminance curve. However, when color channels are separated out (e.g. Cb/Cr or R/G/B), the mapping between SDR and HDR may be further non-linear. For example, providing a single adjustment to the SDR curve (e.g. dividing input values 102 by three to cover the same range from 0 to 3 as the HDR curve 106) may result in undesired chroma hue shift, because perceived luminance depends on color. For example, raising a luminance value (Y) of a color value results in increasing the Hue angle (H) as one approaches the upper limit of Y (e.g. 1), and decreasing H as one approaches the lower limit of Y (e.g. 0). This may change a pixel from, for example, a yellowish green to a reddish orange, at some extremes.

Figure 1B:
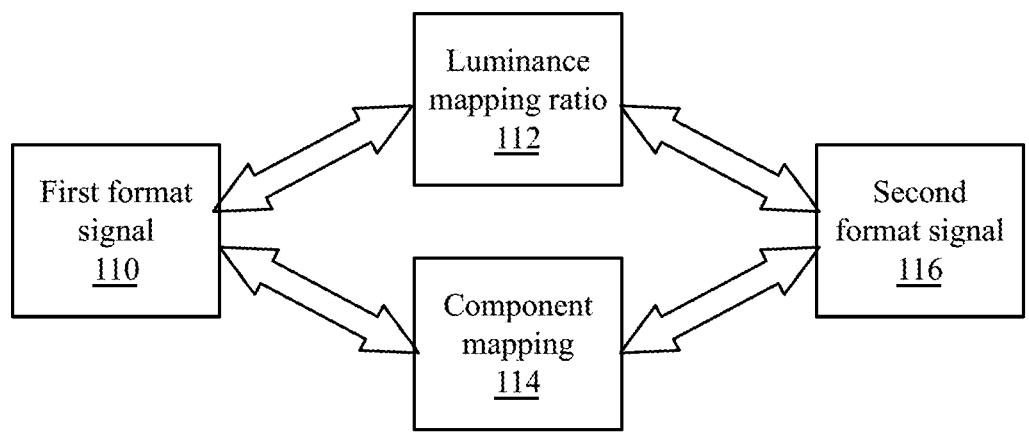
FIG. 1B is a block diagram of an implementation of a system for luminance processing during conversions between media formats, including SDR and HDR media formats.

Accordingly, the systems and methods discussed herein provide for transformation between media formats, such as between SDR and HDR media or between HDR media formats, without undesired hue shifting. As illustrated in the block diagram of FIG. 1B, showing an implementation of a system for luminance processing during conversions between media formats 110 and 116, the linear light dynamic range conversion may include either or both of two approaches: luminance mapping ratio 112, and direct R,G,B component mapping 114. As shown, the conversion process may be bi-directional; that is, the same processes may be used for converting from SDR to HDR as from HDR to SDR, or between various HDR formats.

In a first technique, referred to herein as luminance mapping ratio 112, each output linear light R, G, B component of a second format signal 116 may be derived by a linear equation from each input linear light R, G, B component of a first format signal 110, multiplied by a luminance ratio (LMR[$Y_{in}$]) of output and input pixels (e.g. given an input SDR pixel at 100 nits of brightness, and an output HDR pixel to be at 300 nits, the luminance ratio LMR[$Y_{in}$] is 3). This scaled value may be further multiplied by a multiplicand scale factor (S), providing adjustment of peak luminance values; and may be added to an additive offset (A), providing black level adjustment. For example, given a mapping between an SDR luminance curve and HDR luminance curve that both start at 0 signal value/input light value, as shown in the example of FIG. 1A, the multiplicand scale value S may be 1, and the additive offset A may be 0. However, in a different mapping in which the SDR curve may be gamma shifted to represent brighter input light levels, there may be a corresponding negative additive offset A. Similarly, in a mapping in which the SDR curve is broadened by a knee at high or low signal values, the multiplicand scale value S may be increased or decreased. Thus, as an equation, the luminance mapping ratio technique may be represented in some implementations as:

Output(color channel value)=Input(color channel value)*LMR[$Y_{in}$])*S+A;

for each color channel of the media (e.g. Output(R) based on Input (R); Output(G) based on input (G); and Output(B) based on Input(B)). The calculation may be performed on each color component value for the pixel iteratively, in any order, or in parallel, or in a combination of parallel and serial (e.g. performing calculations for red and blue channels together, and then for a green channel, or in any other order).

In some implementations, input and output signals may be normalized (e.g. to values between 0 and 1), so the luminance ratio value may refer to pre-renormalization ratio.

The luminance ratio LMR[$Y_{in}$] can be a linear or non-linear function implemented in a lookup table (LUT) or a piecewise linear function (PWL). In some implementations, it may be more efficient to use an LUT with a high number of reference points than a PWL, because the luminance ratio function may tend to have a faster transition curve than direct R,G,B component mapping 114. Accordingly, looking up luminance ratio values LMR[$Y_{in}$] in a LUT may be computationally faster and reduce latency in the processing system. In other implementations, the luminance ratio linear or non-linear function may be dynamically calculated, rather than using a precomputed LUT or PWL approximation.

The luminance mapping ratio technique 112 can be used for dynamic range mapping (e.g. SDR to HDR and HDR to SDR), nonlinear format conversions, system gamma adjustments, or for any other type and form of conversion. For an example of SDR to HDR conversion, as discussed above, luminance ratio function LMR[$Y_{in}$] is the luminance ratio of HDR versus SDR referenced to each input SDR luminance value. If an input SDR pixel is at 100 nits, and the corresponding output HDR pixel is mapped to 300 nits, the luminance ratio LMR[$Y_{in}$] is 3. As discussed above, the ratio function can be implemented in a lookup table. In some implementations, the multiplicand scale factor may be 1.0 and the additive coefficient may be 0.0 for a typical black level or unadjusted gamma offset. The output for each channel is therefore R_out=3*R_in, G_out=3*G_in, B_out=3*B_in.

The luminance mapping ratio technique 112 only adjusts luminance and does not cause any undesired hue shift, even when the luminance transfer function is highly non-linear and the R,G,B, component values are quite different within the same pixel.

The second technique, direct R,G,B component mapping 114, may use a LUT or PWL to directly map an input color component value of a pixel to an output color component value for the pixel in a different format. In some implementations, each component output of R,G,B linear light components may be directly mapped from each input R,G,B linear light component separately through the same linear or non-linear function. The non-linear function can be implemented through a LUT or PWL. Direct R,G,B component mapping 114 can also be used for dynamic range mapping (e.g. SDR to HDR and HDR to SDR), nonlinear format conversions, system gamma adjustments, or any other such format change. For example, in one implementation, given an input SDR pixel with input values of R_in=50, G_in=100, B_in=20, and SDR mapped to HDR in a linear scale of 3, R_out=150, G_out=300, and B_out=60. The same scaling or mapping may be used for each channel, or different mapping per channel. Furthermore, mappings may be non-linear across the pixel range. For example, in one implementation, R_out/R_in may be 3 as discussed above for an input of R_in<100, but may be 2 for an input of R_in>100. The non-linear function may have as many distinct points or mapping regions as desired.

In some implementations, unlike luminance mapping ratio 112, direct R,G,B mapping 114 may result in saturation and hue variations, especially for high luminance level inputs. However, saturation variation can be beneficial in some cases. Additionally, direct R,G,B component mapping 114 tends to be smoother in implementation. It is particularly suitable for PWL-based implementations that utilize fewer reference points than LUT-based implementations for luminance mapping ratio techniques 112, and may accordingly reduce hardware expenses for implementation. In further implementations, luminance mapping and component mapping techniques may be combined to reduce hue variations.

Figure 2:
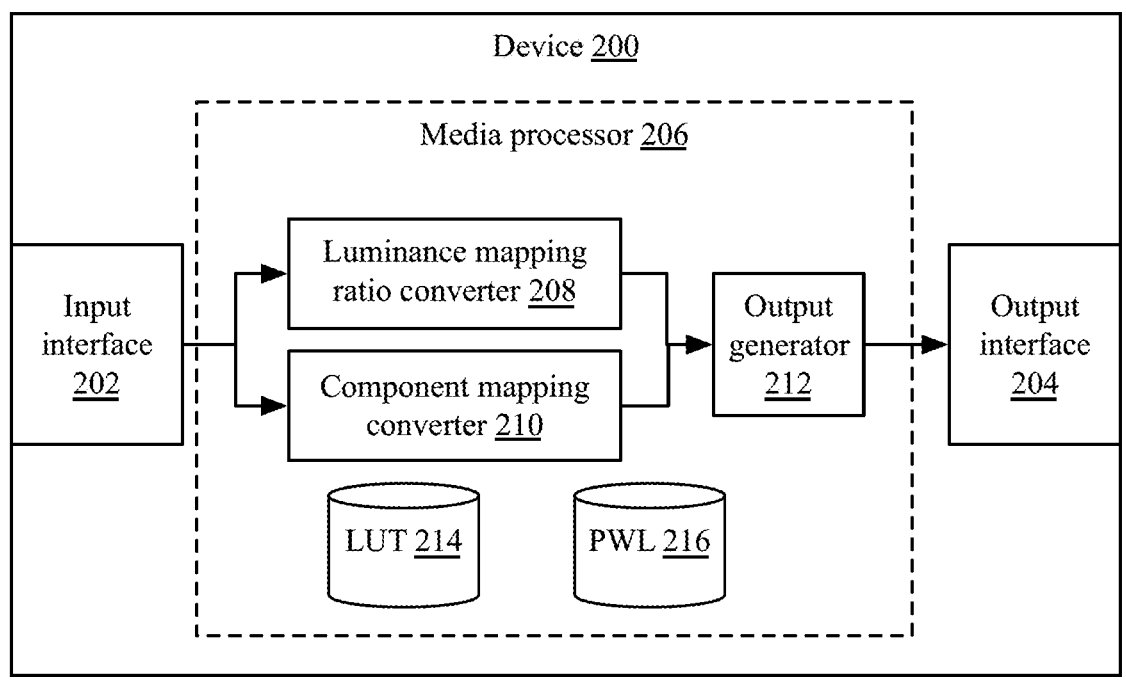
FIG. 2 is a block diagram of an implementation of a computing device for luminance processing during conversions between media formats, including SDR and HDR media formats.

FIG. 2 is a block diagram of an implementation of a computing device for luminance processing during conversions between media formats, including SDR and HDR media formats. A device 200 may comprise a video processor, a set top box, a video router or distribution amplifier, a splitter, an X-Y interface, a switcher, a compositor, or any other type and form of appliance or computing device. Device 200 may comprise a desktop computer, laptop computer, tablet computer, wearable computer, smart phone, smart television, or any other type and form of device. Device 200 may include additional components including one or more processors, one or more memory units, one or more network interfaces, one or more input/output devices such as displays or keyboards, or any other type and form of device. The processors may include a microprocessor, an application-specific integrated circuit (ASIC), a field-programmable gate array (FPGA), etc., or combinations thereof. The memory units may include, but are not limited to, electronic, optical, magnetic, or any other storage or transmission device capable of providing processor with program instructions. The memory units may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The memory units may include one or more applications, services, routines, servers, daemons, or other executable logics for executing applications and for requesting and displaying media files. These applications, services, routines, servers, daemons, or other executable logics may be integrated such that they may communicate with one another or be enabled to make calls to routines of each other.

Device 200 may comprise an input interface 202 and/or output interface 204 for receiving and providing SDR and HDR media, including images, videos, and renderings. In some implementations, an input interface 202 and/or output interface 204 may comprise an HDMI interface, component video interface, DVI interface, DisplayPort interface, or other such video interface. In some implementations, an input interface 202 and/or output interface 204 may comprise a data interface, such as a network interface, Ethernet port, 802.11 (WiFi) interface, BlueTooth interface, cellular interface, satellite interface, or any other type and form of data interface. Thus, device 200 may receive a first item of media in a first format via any type of input, may process and convert the first item of media to a second format, and may provide the first item of media in the second format via any type of output. In some implementations, device 200 may generate media internally, such as when generating a rendered image or video, and thus, input interface 202 may comprise an interface to another application executed by device 200 (e.g. a rendering application, video game, media player, or any other such application).

Device 200 may comprise a media processor 206, which may be implemented in hardware circuitry, software executed by a processor or processors of device 200, or a combination of hardware and software. For example, in one implementation, media processor 206 may comprise an ASIC circuit for converting a media bitstream from a first format to a second format, and may consult a LUT 214 comprising scaling factors or luminance mapping ratios stored in a memory unit of device 200.

Media processor 206 may comprise a luminance mapping ratio converter 208 and/or a component mapping converter 210, in various implementations. Luminance mapping ratio converter 208 and/or component mapping converter 210 may comprise circuitry, software, or a combination of circuitry and software for modifying pixel color component values in a bitstream according to the formulae and methods discussed herein.

In some implementations, media processor 206 may comprise one of a luminance mapping ratio converter 208 or a component mapping converter 210. In some implementations in which media processor 206 comprises both a luminance mapping ratio converter 208 and a component mapping converter 210, media processor 206 may comprise an output generator 212 configured to aggregate or combine outputs of the luminance mapping ratio converter 208 and the component mapping converter 210. Either or both of a luminance mapping ratio converter 208 and a component mapping converter 210 may use a lookup table 214 or piecewise linear function 216 for determining luminance mapping ratios or for mapping from a first format to a second format.

Figure 3A:
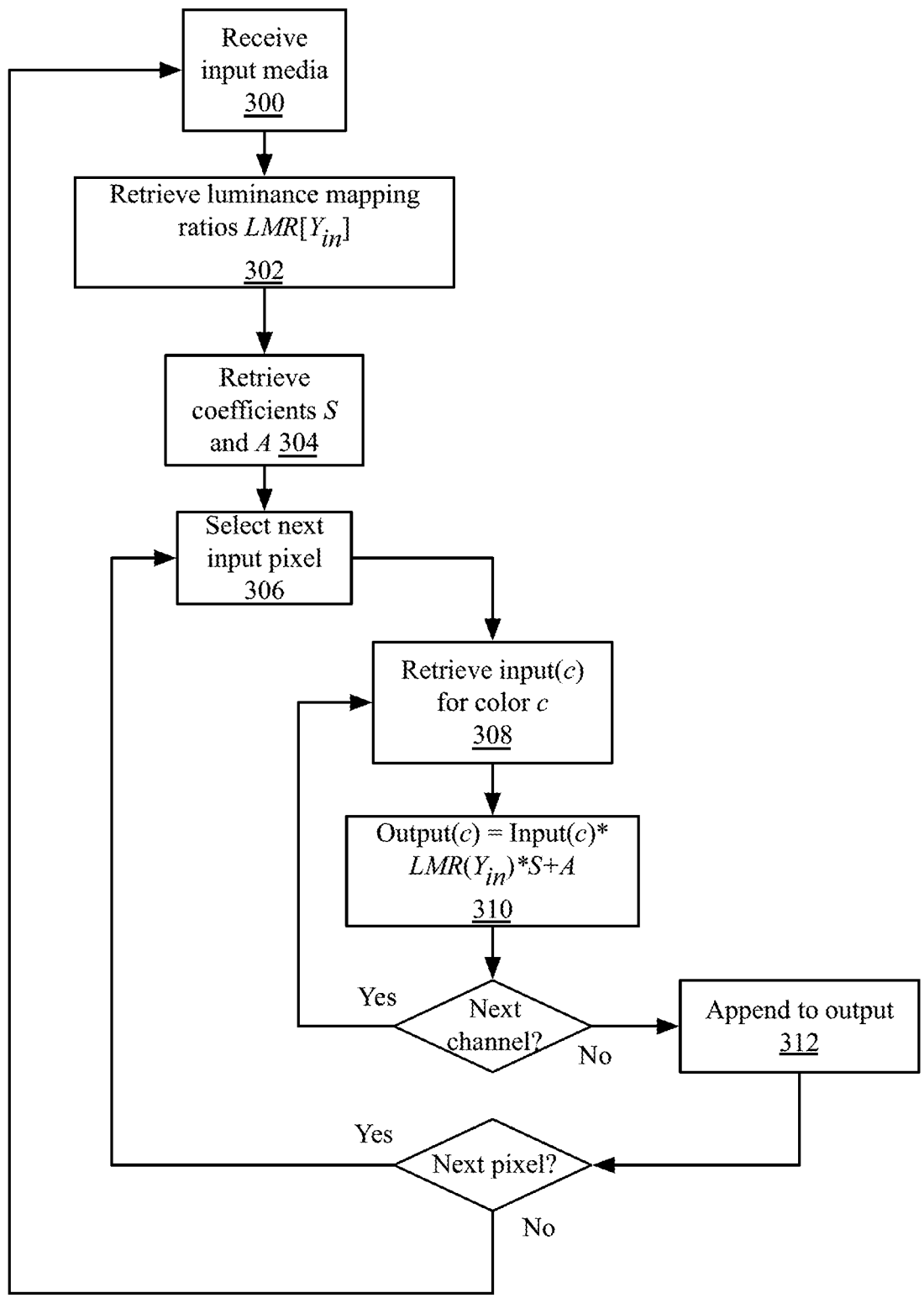
FIGS. 3A-3B are flow charts of implementations of methods for luminance processing during conversions between media formats, including SDR and HDR media formats.

FIG. 3A is a flow chart of an implementation of a method for luminance processing during conversions between media formats, including SDR and HDR media formats, using luminance mapping ratios. Although the flow chart illustrates an implementation in which calculations are done for each color and pixel iteratively or in serial, in some implementations, calculations may be performed in parallel on a plurality of colors and/or pixels. Additionally, although discussed in terms of pixels, in some implementations, the method may process macroblocks or regions of an image simultaneously.

At step 300, a device or media processor of a device may receive an item of input media in a first format, such as SDR or HDR format media. As discussed above, the media may comprise an image, a rendered image, or a video. Receiving the item of input media may comprise receiving the item from a second device, retrieving the item from a buffer or storage device (e.g. hard disk), or generating the item of input media (e.g. by an application, video game, or other such renderer). The image may be received as a bitstream in many implementations.

At step 302, in some implementations, the media processor may retrieve one or more luminance mapping ratios $LMR[Y_{in}]$ for mapping from input to output luminance for the formats. Luminance mapping ratios $LMR[Y_{in}]$ may be color specific (e.g. a different ratio for each color, or different for one color compared to other colors). Luminance mapping ratios $LMR[Y_{in}]$ may be non-linear, with different ratios or scales used for different input ranges. For example, a first range from 0 to 0.2 (of input luminance values normalized to 1) may have a $LMR[Y_{in}]$ of 1, a second range from 0.2 to 0.8 may have a $LMR[Y_{in}]$ of 3, and a third range from 0.8 to 1 have a $LMR[Y_{in}]$ of 2. A greater or lesser number of ranges and ratios may be used. In some implementations, the media processor may retrieve the $LMR[Y_{in}]$ values from a look up table, while in other implementations, the media processor may retrieve a piecewise linear function representing the $LMR[Y_{in}]$ values. In still other implementations, the media processor may compute the $LMR[Y_{in}]$ values computationally, rather than using a pre-calculated PWL or LUT.

At step 304, in some implementations, the media processor may retrieve a multiplicand scaling coefficient S, sometimes referred to as "coef_A". The scaling coefficient may be set by a user or administrator or manufacturer of the device. The scaling coefficient may be used to adjust peak luminance, and may be multiplied by the $LMR[Y_{in}]$-scaled input value. For example, for some media that does not approach peak brightness, a largest value of input luminance may be 100 nits, and given a $LMR[Y_{in}]$ of 3, the output luminance for the pixel may be 300 nits. However, a display device may be able to provide a greater output (e.g. 400 nits). Accordingly, the scaling coefficient S may be set to 1.3 to increase the peak luminance to the desired output.

Similarly at step 304, in some implementations, the media processor may retrieve an additive offset coefficient A, sometimes referred to as "coef_C". The additive offset coefficient may be set by a user or administrator or manufacturer of the device. The offset may be used to adjust black levels. Although referred to as additive, in many implementations, the offset may be negative or subtracted from a $LMR[Y_{in}]$-scaled input value. For example, if a darkest portion of an input image has a value of 20 nits, an offset of −20 may be applied to reduce the darkest portion to 0 in the output.

Scaling coefficient S and/or offset coefficient A may be retrieved from a lookup table, user setting or configuration storage, and/or communicated with or received from a second device (e.g. media display device, such as a smart television, A/V receiver, or other device).

At step 306, the media processor may select a next pixel of the input media or bitstream. In some implementations, the media processor may select a plurality of pixels, such as a line or macroblock, for simultaneously processing.

At step 308, the media processor may retrieve or extract a color component value input(c) for the pixel from the input media, such as a red, blue, or green value (or, in other color representations or encodings, a Pb, Pr, Cb, or Cr value). The color component value may be encoded as an 8-bit number in SDR formats, or with more bits in HDR formats, or in any other representation.

At step 310, the media processor may calculate an output or modified color component value output(c) in the second format, by multiplying the input color component value input(c) by the luminance mapping ratio $LMR[Y_{in}]$. For example, the media processor may calculate an output value output(red) by multiplying an input value input(red) by $LMR[Y_{in}]$. In some implementations, the media processor may also multiply the input color component value input(c) by the scaling factor S and/or may add the additive offset A. In other implementations, the scaling factor S may be 1 and/or the additive offset A may be 0, and these operations may be skipped.

If there are additional color channels (e.g. red, green, blue, Pb, Pr, Cb, Cr, etc.), then steps 308-310 may be repeated for each additional color channel. In some implementations, steps 308-310 may be performed for each color channel in parallel. Once all calculations are complete, at step 312, the modified pixel may be appended to an output, such as an output bit stream or file.

If there are additional pixels, lines, or macroblocks of the media, then steps 306-312 may be repeated iteratively or in parallel, as shown.

Although steps 302 and 304 are shown prior to steps 306 and 308, in some implementations, the media processor may retrieve the luminance mapping ratio $LMR[Y_{in}]$ and/or coefficients S and A during calculations at step 310. This may be done, for example, in implementations in which the ratio $LMR[Y_{in}]$ or coefficients S and A may depend on the input pixel value.

Figure 3B:
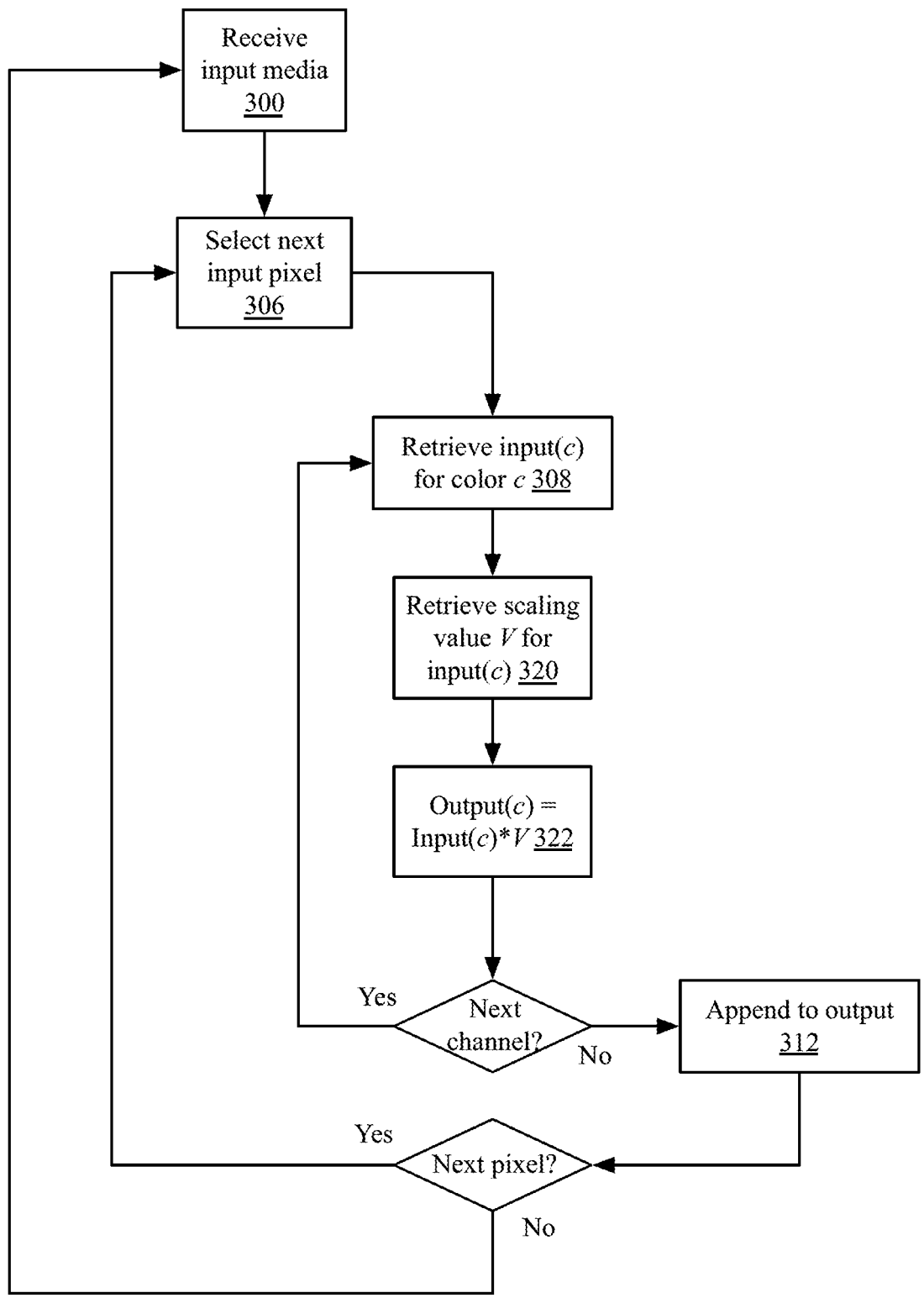

FIG. 3B is a flow chart of an implementation of a method for luminance processing during conversions between media formats, including SDR and HDR media formats, using direct component mapping. As shown, steps 300, 306, 308, and 312 may be similar to those discussed above in connection with FIG. 3A. For processing the pixel, however, at step 320, the media processor may retrieve a scaling or mapping value V for the input color component value input(c). The scaling or mapping value V may be retrieved from a lookup table stored in memory of the media processor, or may be determined from a piecewise linear function. The mappings may be the same across color channels (e.g. an input value of 50 corresponds to an output value of 100, regardless of color), or may be different (e.g. an input value of 50 for green corresponds to an output value of 100, but an input value of video for blue corresponds to an output value of 120). Mapping may incorporate black level adjustments and peak luminance adjustments in a single step.

At step 322, the output value for each channel may be calculated as the output(c) equals input(c) multiplied by the scaling value V. In some implementations, multiple channels may be calculated simultaneously, and the scaling value V may be multi-dimensional (e.g. corresponding to the number of color channels). Thus, an output(R,G,B) may be equal to an input(R,G,B) multiplied by V[r,g,b]. As discussed above, once calculated, the output may be appended to a bit stream or file at step 312. The process may be repeated for each additional pixel, line, or macroblock in the media.

Additionally, as discussed above, in some implementations, the methods of FIGS. 3A and 3B may be combined. For example, in one such implementation, after step 308, the media processor may determine whether to go to step 310 of FIG. 3A or step 320 of FIG. 3B, based on the input value input(c) and/or scaling and mapping values. For example, in one implementation, the luminance mapping ratio technique of FIG. 3A may be applied when the input color value is between 50 and 250; and the direct RGB component mapping technique of FIG. 3B may be applied when the input color value is between 0 and 50 or above 250. This may result in faster processing for input values that are very dark or very bright, while still achieving the hue accuracy of the luminance mapping ratio technique at moderate brightness levels.

Thus, the systems and methods discussed herein provide for luminance conversion between various media formats and dynamic ranges. In one aspect, the present disclosure is directed to a method for converting between standard dynamic range (SDR) media and high dynamic range (HDR) media. The method includes receiving, by a media processor, an input media item in a first format. The method includes determining, by the media processor, a luminance mapping ratio between an pixel of the input media item in the first format and a corresponding pixel of the media item in a second format. For each pixel of the media item in the first format, the method includes, for each color component value of the pixel: calculating, by the media processor, an output value based on a product of the color component value of the pixel and the luminance mapping ratio, and replacing, by the media processor, the color component value of the pixel with the calculated output value in the second format. The method also includes providing, by the media processor, the media item in the second format.

In some implementations, the first format is SDR media, and the second format is HDR media. In a further implementation, the luminance mapping ratio is greater than 1. In other further implementations, the luminance mapping rations may be less than 1. In some implementations in which an input and/or output value is normalized, the luminance mapping ratio may be greater than 1 before renormalization. In many implementations, the luminance mapping ratio may be different values for different inputs (e.g. a first value n for a first input value, and a second value m for a second input value). In some implementations, determining the luminance mapping ratio further comprises retrieving the luminance mapping ratio, by the media processor, from a format conversion lookup table. In some implementations, determining the luminance mapping ratio further comprises identifying the luminance mapping ratio, by the media processor, from a piecewise linear function. In some implementations, the method includes determining, by the media processor, a peak luminance scaling factor; and calculating the output value, for each color component value of the pixel, includes calculating, by the media processor, the output value based on the product of the color component value of the pixel, the luminance mapping ratio, and the peak luminance scaling factor. In a further implementation, the method includes determining, by the media processor, a black level adjustment coefficient; and calculating the output value, for each color component value of the pixel, includes calculating, by the media processor, the output value comprising a sum of the black level adjustment coefficient and the product of the color component value of the pixel, the luminance mapping ratio, and the peak luminance scaling factor.

In another aspect, the present disclosure is directed to a method for converting between standard dynamic range (SDR) media and high dynamic range (HDR) media. The method includes, for each of a plurality of colors of a media item in a first format, retrieving, by a media processor of a device, a mapping factor from the first format to a second format. The method also includes, for each pixel of an item of input media in the first format and for each color component value of the pixel: calculating an output value, by the media processor, comprising a product of the color component value of the pixel and the mapping factor for the corresponding color.

In some implementations, the mapping factors for each of the plurality of colors are equal. In some implementations, the method includes retrieving the mapping factor, by the media processor, from a format conversion lookup table. In some implementations, the method includes identifying the mapping factor, by the media processor, from a piecewise linear function. In some implementations, the mapping factor varies based on the color component value of the pixel.

In another aspect, the present disclosure is directed to a system for converting between standard dynamic range (SDR) media and high dynamic range (HDR) media. The system includes a media processor of a device comprising an input and an output. The input is configured to receive an input media item in a first format. The media processor is configured to determine a luminance mapping ratio between an pixel of the input media item in the first format and a corresponding pixel of the media item in a second format. The media processor is also configured to, for each pixel of the media item in the first format and for each color component value of the pixel: calculate an output value based on a product of the color component value of the pixel and the luminance mapping ratio, and replace the color component value of the pixel with the calculated output value in the second format. The output is configured to provide the media item in the second format.

In some implementations, the first format is SDR media, and the second format is HDR media. In a further implementation, the luminance mapping ratio is greater than 1.

In some implementations, the system includes a memory unit of the device storing a format conversion lookup table; and the media processor is further configured to retrieve the luminance mapping ratio from the format conversion lookup table.

In some implementations, the media processor is further configured to identify the luminance mapping ratio from a piecewise linear function. In some implementations, the media processor is further configured to: determine a peak luminance scaling factor; and calculate the output value, for each color component value of the pixel, by calculating the output value based on the product of the color component value of the pixel, the luminance mapping ratio, and the peak luminance scaling factor. In a further implementation, the media processor is further configured to determine a black level adjustment coefficient; and calculate the output value, for each color component value of the pixel, by: calculating the output value comprising a sum of the black level adjustment coefficient and the product of the color component value of the pixel, the luminance mapping ratio, and the peak luminance scaling factor. In some implementations, the mapping factor varies based on the color component value of the pixel.

B. Computing and Network Environment

Figure 4A:
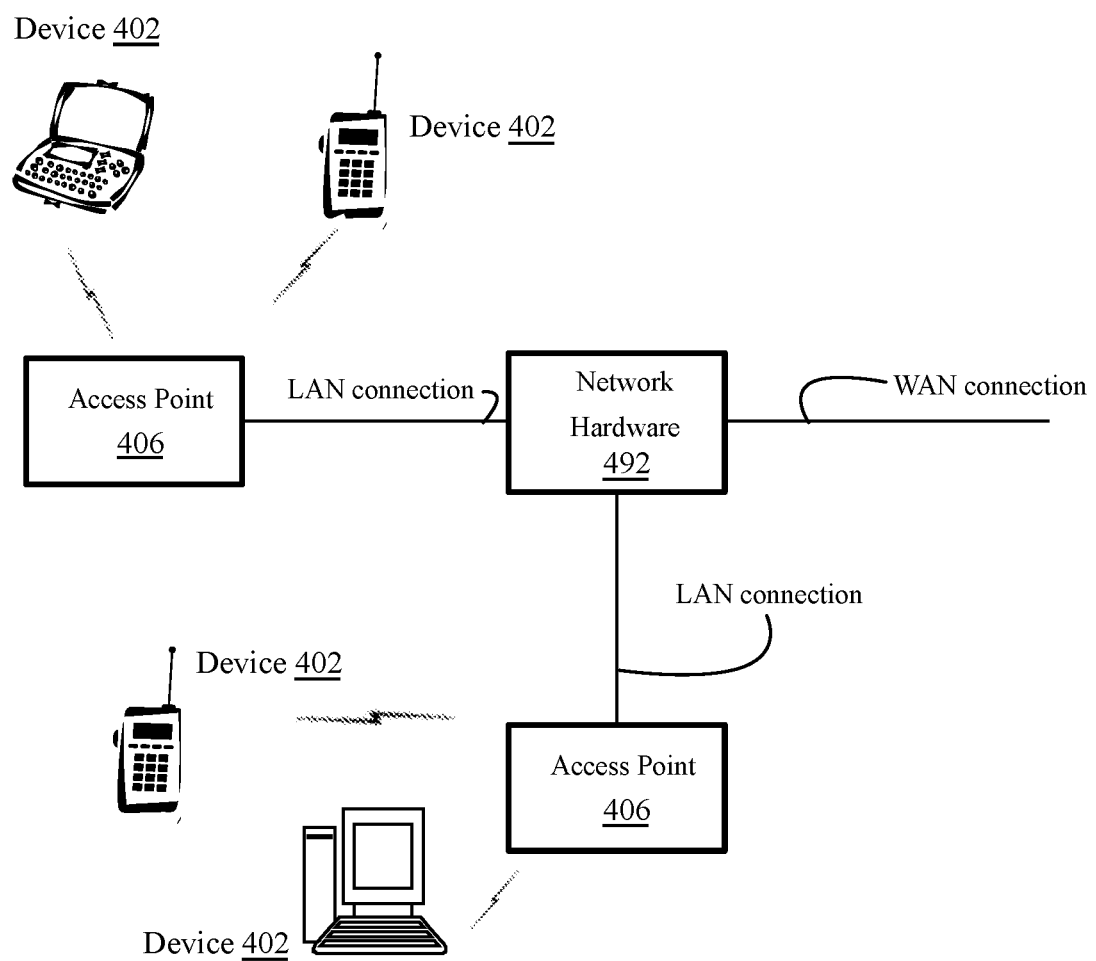
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment.

The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a stand-alone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
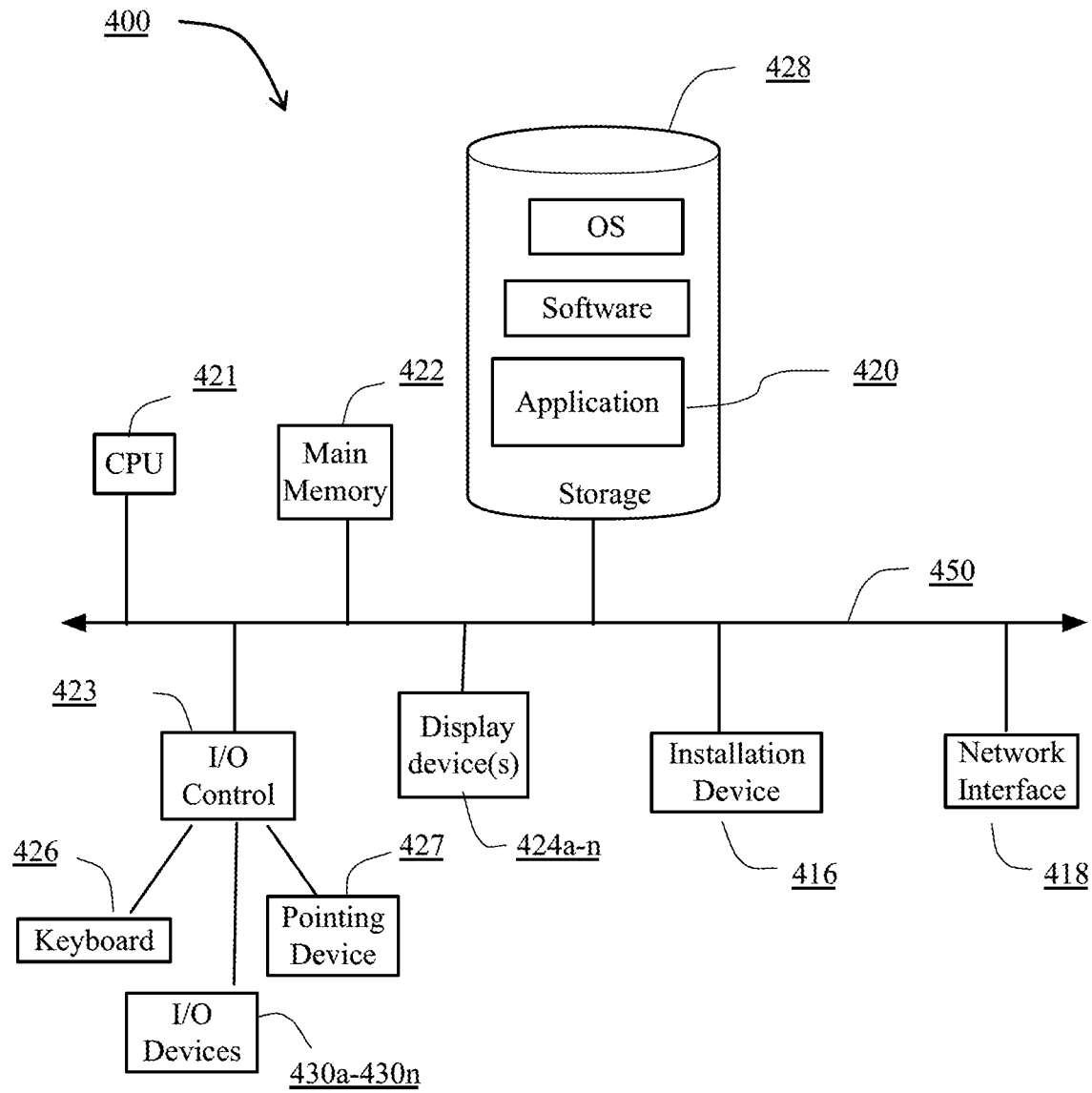
FIGS. 4B and 4C are block diagrams depicting embodiments of computing devices useful in connection with the methods and systems described herein.
Figure 4C:
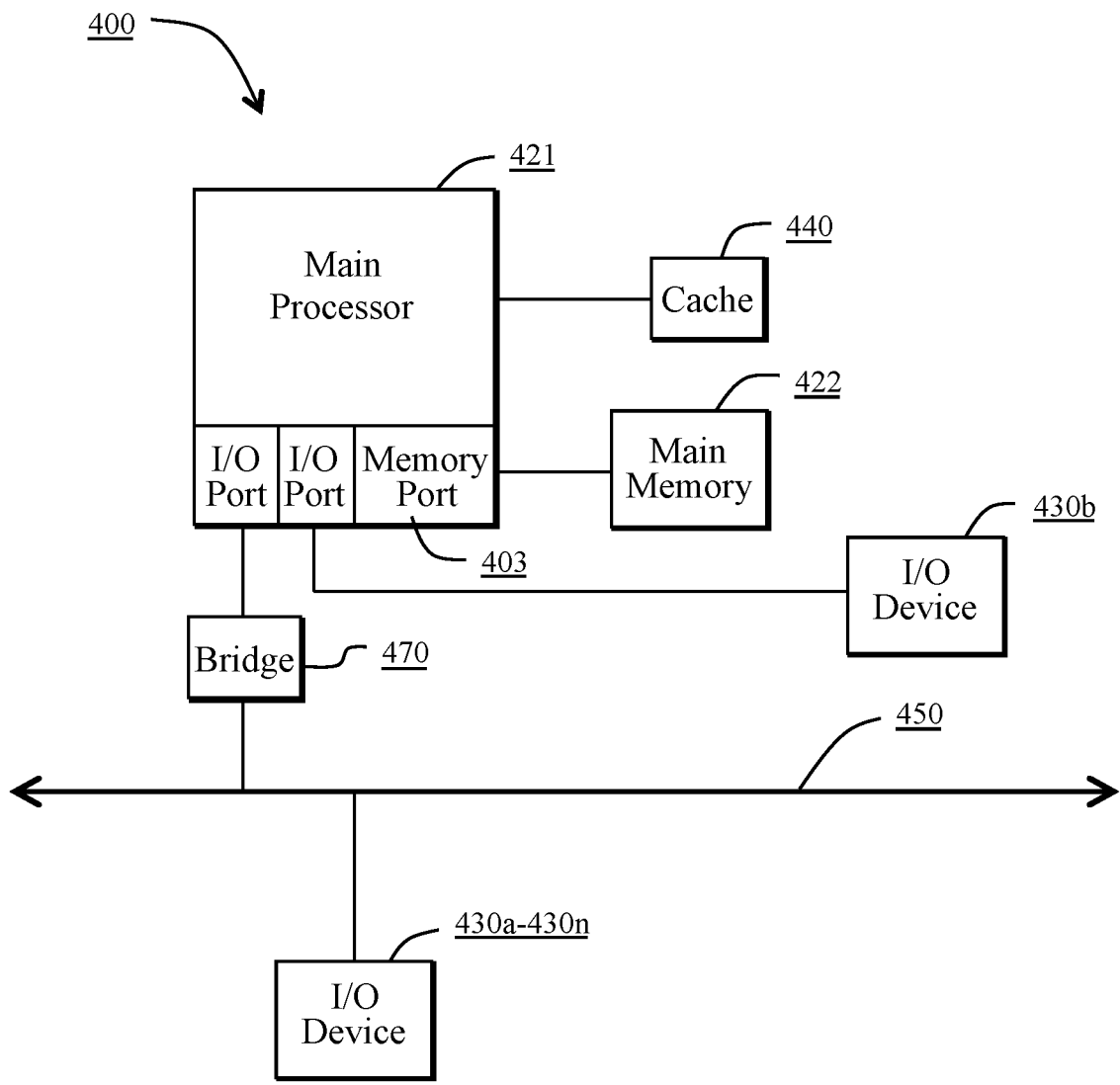

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for converting between standard dynamic range (SDR) media and high dynamic range (HDR) media, comprising:
   receiving, by a media processor, an input media item in a first format;
   determining, by the media processor, a mapping factor between a pixel of the input media item in the first format and a corresponding pixel of the media item in a second format;
   for each pixel of the media item in the first format:
      for each color component value of the pixel:
         calculating, by the media processor, an output value based on a product of the color component value of the pixel and the mapping factor, wherein the mapping factor varies based on the color component value of the pixel, and
         replacing, by the media processor, the color component value of the pixel with the calculated output value in the second format; and
   providing, by the media processor, the media item in the second format.

2. The method of claim 1, wherein the first format is SDR media, and the second format is HDR media.

3. The method of claim 1, wherein the mapping factor is greater than 1 for at least one pixel of the media item, prior to any renormalization of color component values.

4. The method of claim 1, wherein determining the mapping factor further comprises retrieving the mapping factor, by the media processor, from a format conversion lookup table.

5. The method of claim 1, wherein determining the mapping factor further comprises identifying the mapping factor, by the media processor, from a piecewise linear function.

6. The method of claim 1, further comprising:
determining, by the media processor, a peak luminance scaling factor; and
wherein calculating the output value, for each color component value of the pixel, further comprises:
calculating, by the media processor, the output value based on the product of the color component value of the pixel, the mapping factor, and the peak luminance scaling factor.

7. The method of claim 6, further comprising:
determining, by the media processor, a black level adjustment coefficient; and
wherein calculating the output value, for each color component value of the pixel, further comprises:
calculating, by the media processor, the output value comprising a sum of the black level adjustment coefficient and the product of the color component value of the pixel, the mapping factor, and the peak luminance scaling factor.

8. A method for converting between standard dynamic range (SDR) media and high dynamic range (HDR) media, comprising:
for each of a plurality of colors of a media item in a first format, retrieving, by a media processor of a device, a mapping factor from the first format to a second format;
for each pixel of an item of input media in the first format:
for each color component value of the pixel:
calculating an output value, by the media processor, comprising a product of the color component value of the pixel and the mapping factor for the corresponding color, wherein the mapping factor varies based on the color component value of the pixel.

9. The method of claim 8, wherein the mapping factors for each of the plurality of colors are equal.

10. The method of claim 8, wherein retrieving the mapping factor comprises retrieving the mapping factor, by the media processor, from a format conversion lookup table.

11. The method of claim 8, wherein retrieving the mapping factor comprises identifying the mapping factor, by the media processor, from a piecewise linear function.

12. A system for converting between standard dynamic range (SDR) media and high dynamic range (HDR) media, comprising:
a media processor of a device comprising an input and an output;
wherein the input is configured to receive an input media item in a first format;
wherein the media processor is configured to:
determine a mapping factor between a pixel of the input media item in the first format and a corresponding pixel of the media item in a second format,
for each pixel of the media item in the first format:
for each color component value of the pixel:
calculate an output value based on a product of the color component value of the pixel and the mapping factor, wherein the mapping factor varies based on the color component value of the pixel, and
replace the color component value of the pixel with the calculated output value in the second format; and
wherein the output is configured to provide the media item in the second format.

13. The system of claim 12, wherein the first format is SDR media, and the second format is HDR media.

14. The system of claim 13, wherein the mapping factor is greater than 1.

15. The system of claim 12, further comprising a memory unit of the device storing a format conversion lookup table; and wherein the media processor is further configured to retrieve the mapping factor from the format conversion lookup table.

16. The system of claim 12, wherein the media processor is further configured to identify the mapping factor from a piecewise linear function.

17. The system of claim 12, wherein the media processor is further configured to:
determine a peak luminance scaling factor; and
calculate the output value, for each color component value of the pixel, by:
calculating the output value based on the product of the color component value of the pixel, the mapping factor, and the peak luminance scaling factor.

18. The system of claim 17, wherein the media processor is further configured to:
determine a black level adjustment coefficient; and
calculate the output value, for each color component value of the pixel, by:
calculating the output value comprising a sum of the black level adjustment coefficient and the product of the color component value of the pixel, the mapping factor, and the peak luminance scaling factor.

* * * * *